US008543509B1

(12) United States Patent
Gundy

(10) Patent No.: US 8,543,509 B1
(45) Date of Patent: Sep. 24, 2013

(54) PAYMENT SYSTEM FOR TRANSACTIONS BENEFITTING CHARITIES

(71) Applicant: Taylor Gundy, Woodland Hills, CA (US)

(72) Inventor: Taylor Gundy, Woodland Hills, CA (US)

(73) Assignee: DailyDonor, Inc., Woodland Hills, CA (US)

( * ) Notice: Subject to any disclaimer, the term of this patent is extended or adjusted under 35 U.S.C. 154(b) by 0 days.

(21) Appl. No.: 13/759,907

(22) Filed: Feb. 5, 2013

Related U.S. Application Data

(63) Continuation of application No. 13/758,008, filed on Feb. 4, 2013.

(51) Int. Cl.
G06Q 40/00 (2012.01)

(52) U.S. Cl.
USPC ............... 705/44; 705/35; 705/36 R; 705/37; 705/38; 705/39; 705/40; 705/41; 705/42; 705/43; 705/45

(58) Field of Classification Search
USPC ..................................... 705/35–45
See application file for complete search history.

(56) References Cited

U.S. PATENT DOCUMENTS

| | | | | |
|---|---|---|---|---|
| 7,698,228 B2 * | 4/2010 | Gailey et al. | | 705/64 |
| 7,753,264 B2 * | 7/2010 | Shafer et al. | | 235/380 |
| 7,857,212 B1 * | 12/2010 | Matthews | | 235/380 |
| 7,860,519 B2 * | 12/2010 | Portman et al. | | 455/456.3 |
| 7,953,630 B2 * | 5/2011 | Fowler et al. | | 705/14.3 |
| 2005/0144098 A1 * | 6/2005 | Vance et al. | | 705/35 |
| 2008/0010193 A1 * | 1/2008 | Rackley, III et al. | | 705/39 |
| 2012/0130790 A1 * | 5/2012 | Lyons et al. | | 705/14.25 |
| 2012/0267432 A1 * | 10/2012 | Kuttuva | | 235/379 |
| 2012/0276868 A1 * | 11/2012 | Martell | | 455/406 |
| 2013/0091452 A1 * | 4/2013 | Sorden et al. | | 715/771 |

* cited by examiner

Primary Examiner — Narayanswamy Subramanian
(74) Attorney, Agent, or Firm — Fish & Richardson P.C.

(57) ABSTRACT

Methods, systems, and apparatus, including computer programs encoded on a computer storage medium, for presenting offers and processing payment transactions. A method includes receiving current location information from a mobile device associated with the user; providing a list of merchants that are in an immediate proximity to the user and receiving a selection of one of the merchants. The method further includes providing to the user for presentation on the mobile device a charge authorization form for the merchant; providing to the user a final authorization form that includes an area for a password that is associated with an account of the user; authorizing the transaction based at least in part on the receipt of the password; and providing a code for presentation on the user device to enable the user to complete the transaction with the merchant.

14 Claims, 7 Drawing Sheets

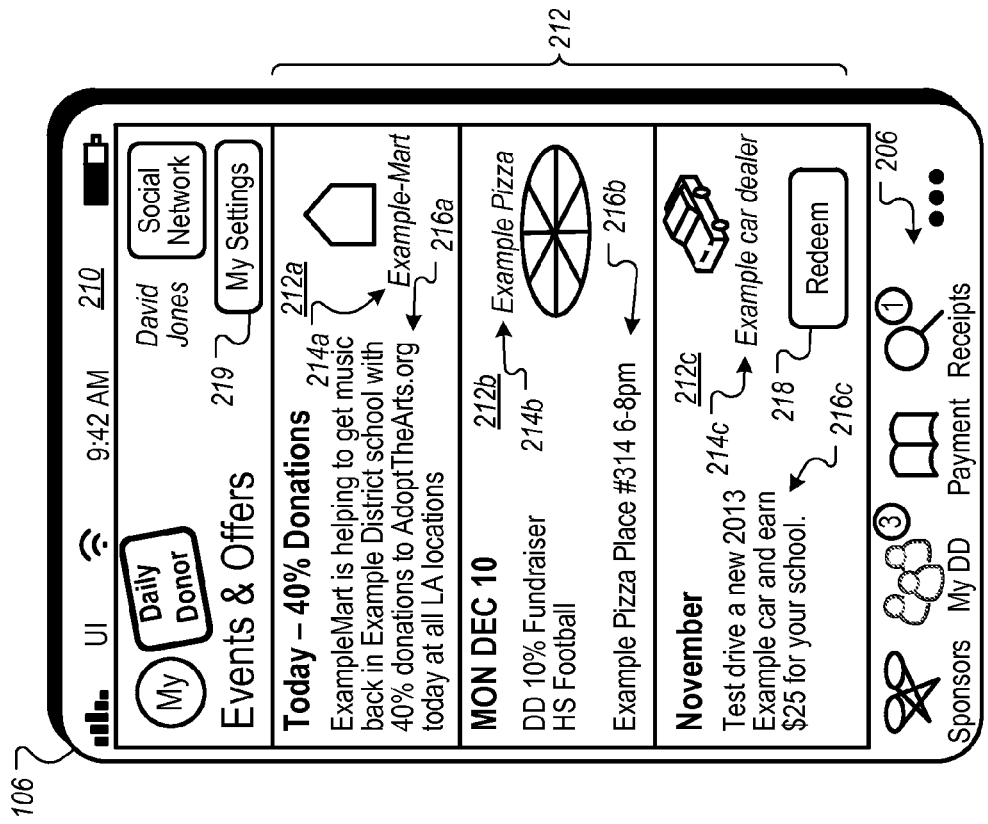
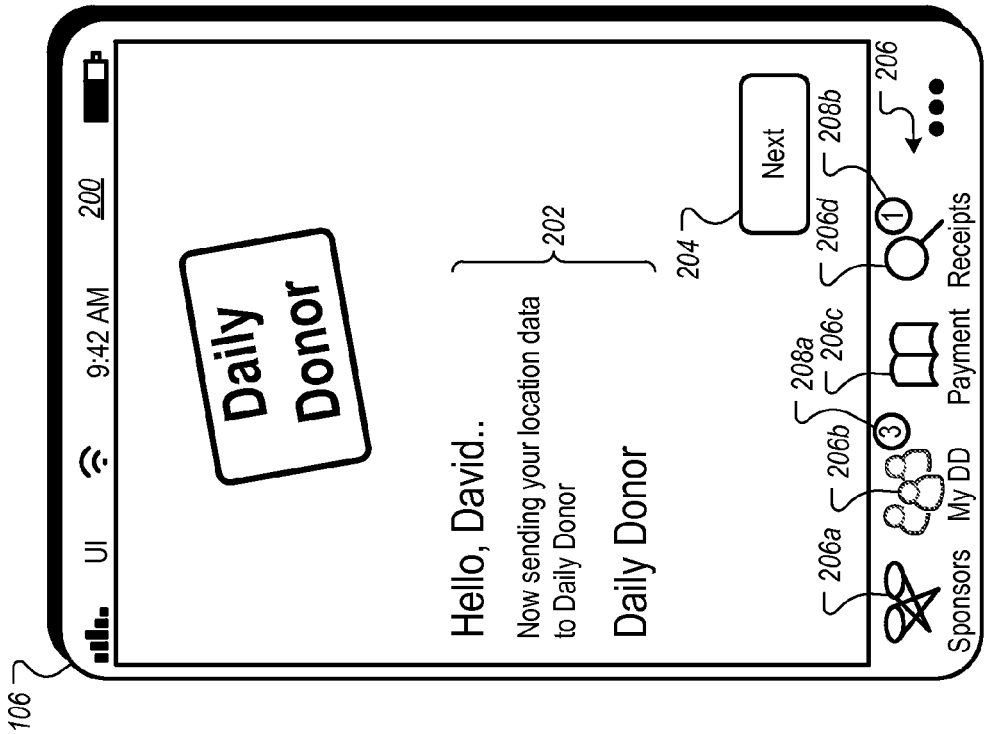
FIG. 2B
FIG. 2A

PAYMENT SYSTEM FOR TRANSACTIONS BENEFITTING CHARITIES

BACKGROUND

This specification relates to transactions for goods and services.

Individuals can enter into transactions with merchants, such as business entities that provide goods and services. For example, a person may start the day buying coffee at a coffee shop, have lunch at a pizza place, and stop at the dry cleaners on the way home from work. Each transaction can be made with a respective merchant using the merchant's accepted payment methods. While such transactions are discrete, creating systems and mechanisms to facilitate a more user friendly (as opposed to merchant friendly) buying process may encourage individuals to conduct more business. For example, if all (or a significant portion of) transactions of a customer were able to be processed through a central entity, the entity could provide better service from a user perspective. For example, the entity may be able to offer better perks (discounts, coupons, or other incentives) which may benefit both the customer and the merchants.

Mobile devices make it possible for users to stay connected while they are away from home or work. For example, a user with a smartphone can access the Web from virtually anywhere (i.e., within the limits of the cellular phone system). Given the ubiquitous nature of mobile devices in society today, taking advantage of the capabilities of the devices in a transaction process may provide benefits to the end user.

SUMMARY

In general, one innovative aspect of the subject matter described in this specification can be embodied in methods that include the actions of receiving an indication to initiate a payment transaction using a payment system; receiving current location information from a mobile device associated with the user; providing a list of merchants that are in an immediate proximity to the user based on the current location information; receiving a selection of one of the merchants and providing to the user for presentation on the mobile device a charge authorization form for the merchant wherein the charge authorization form includes an area for receipt of a charge amount. The method further includes receiving from the mobile device the charge amount; providing to the user a final authorization form that includes an area for a password that is associated with an account of the user; receiving the password to authorize the payment; authorizing the transaction based at least in part on the receipt of the password and providing a code for presentation on the user device to enable the user to complete the transaction with the merchant. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. A mobile payment transaction service is provided that facilitates ease of payment for the user. The mobile payment transaction service can identify a merchant in physical proximity to a user and facilitate a transaction with the detected merchant. The transaction can include incentives for the user, such as incentives for consummating transactions with the merchant. The incentives can include an ability of the user to designate a charity for receipt of a portion of the proceeds from a given transaction. In situations where no sales transaction occurs, the methods proposed can enable a company/merchant to register a promotion (such as offering a donation if the user performs a certain act (takes a test drive, shows up at a certain location, etc.)).

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 2A is a screenshot of an example user interface for making donations associated with transactions with local merchants.

FIG. 2B is a diagram of an example promotion selection screen.

Like reference numbers and designations in the various drawings indicate like elements.

DETAILED DESCRIPTION

Figure 1:
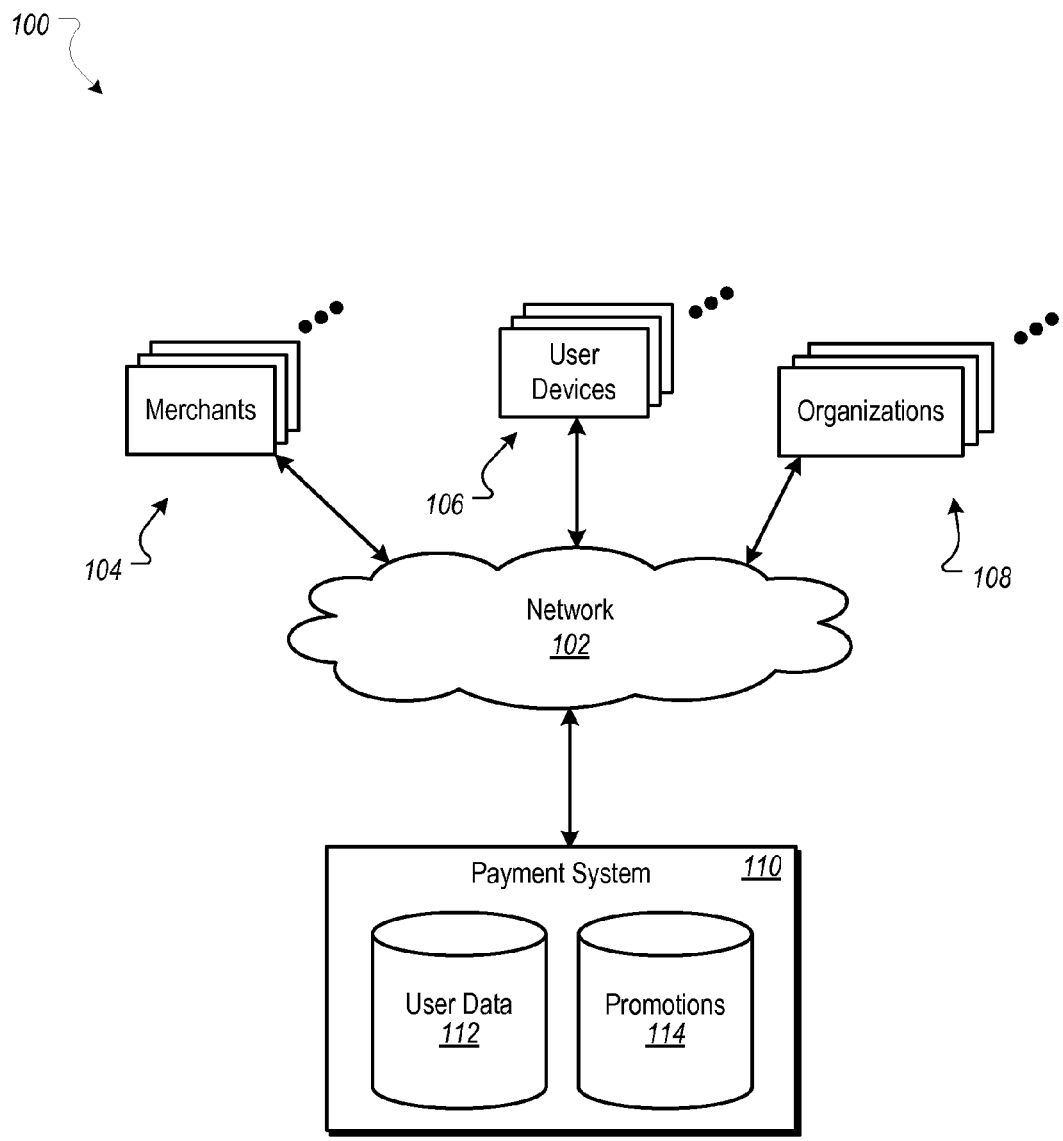
FIG. 1 is a block diagram of an example environment for completing transactions with a proximate merchant.

FIG. 1 is a block diagram of an example environment 100 for completing transactions with a proximate merchant of the merchants 104. In some implementations, the transaction can result in a donation to occur as a result of the transaction to one or more organizations 108. For example, organizations 108 can be charities, not-for-profit groups or other entities that can receive a donation when users complete certain transactions with a merchant 104, such as stores, restaurants or other business entities. The example environment 100 includes a payment system 110 for maintaining user donor accounts (e.g., in user data 112), identifying nearby local entities, handling transactions between users and the merchants, and maintaining user records associated with associated transactions and donations (e.g., in user data 112). The payment system 110 also includes a data store of promotions 114 that can include information about events and offers. In some implementations, an event can have an associated donation amount that represents a portion or percentage of a user transaction with a given merchant 104 that is to be provided to organizations 108. Other arrangements can also be used, such as fixed monetary amounts or some other non-monetary donations. In some implementations, a user can RSVP to an event, such as making a pledge to attend/redeem a promotion or event.

The example environment 100 includes a network 102, such as a local area network (LAN), a wide area network (WAN), the Internet, or a combination thereof. The network 102 connects merchants 104, user devices 106, organizations 108, and the payment system 110. The example environment 100 may include many thousands of merchants 104, user devices 106, and organizations 108. In some implementations, each of the user devices 106 can include a donor application that can provide a user interface and front end for the payment system 110. In some implementations, the donor application can be resident on the device. In some implementations, portions of the donor application can be resident on a server while a presentation layer remains on a client device. That is, the functions attributable to the donor application can be executed on the mobile device, in a cloud, on a server, or other locations as required depending on the configuration of the system.

FIG. 2A is a screenshot of an example user interface 200 for making donations associated with transactions with local merchants. The user interface 200 shows an initiation message 202 that can appear, for example, when the user initiates a donor application on the user device 106. For example, during initiation, the donor application can determine the user's current location, e.g., for subsequent comparison with the locations of nearby merchants 104 for which donor transactions can occur. As example donor transaction can be a sale at a local pizza shop that results in a donation to a designated organization 108, e.g., 10% of a pizza meal donated to a fine arts organization. Other actions can occur at initiation time, such as accessing user account information for the user, e.g., from the user data 112. The account information can include, for example, preference information for the user and historical information (e.g., information related to payments that the user has made to merchants 104 for transactions handled by the payment system 110 in the past). The account information can also identify donation amounts and corresponding organizations 108 that have resulted from transactions (e.g., purchases) associated with the user. Other information related to the user, the user account, or preferences of the user can be made available to the user after initiation.

The user interface 200 can include controls by which the user can navigate so as to invoke various functions of the donor application. For example, the user can use a control 204 to exit the initial screen, such as after the location data is determined. Other controls 206 can include controls for navigating to and/or performing functions of the donor application. A sponsor's control 206a can provide access to sponsor information, e.g., merchants 104 that are participating in donor programs. A "my daily donor" control 206b can provide access to a user's current opportunities (e.g., See FIG. 2B) for nearby merchants 104. A payment control 206c can provide access to a charge authorization form (e.g., See FIG. 2C) through which the user can make a payment to a particular merchant 104. A receipts control 206d can provide the user with access to a screen that lists information about receipts associated with the user's purchases under the donor system.

In some implementations, indicators 208a and 208b can provide counts of individual items that are accessible through corresponding controls 206. For example, a count indicated by the indicator 208a (e.g., 3) can indicate that there are three donor opportunities associated with the "my daily donor" control 206b. In another example, a count indicated by the indicator 208b (e.g., 1) can indicate that there is one receipt viewable by the user that is accessible though the receipts control 206d.

FIG. 2B is a diagram of an example promotion selection screen 210. For example, the promotion selection screen 210 can list promotions 212 (e.g., events and offers) that are identified, for example, based on nearby merchants 104 that participate in donor programs and that match the user's account and settings. In the example shown on FIG. 2B, three promotions 212a-212c are available. Other numbers and kinds of promotions are possible.

Merchant labels 214a-214c identify the merchants associated with the respective promotions 212a-212c. Promotion descriptions 216a-216c describe the respective promotions 212a-212c. Selection of a settings control 219, accessible on the promotion selection screen 210 and other screens in the donor application, can navigate the user to a screen for maintaining current settings in the donor application, including charities and organizations that are to benefit from transactions associated with the promotions 212a-212c.

Figures 2C, 2D:
FIG. 2C is a diagram of an example charge authorization form.
FIG. 2D is a diagram of an example final authorization form.

In some implementations, the user can initiate payment for a selected one of the promotions 212a-212c by selecting a redeem control 218. This can navigate the user to a payment screen (See: FIG. 2C) where information for the selected promotion is automatically filled in.

FIG. 2C is a diagram of an example charge authorization form 220. For example, the charge authorization form 220 can appear after the user selects one of the promotions 212 and/or the redeem control 218 on the promotion selection screen 210, such as the promotion 212b associated with Example Pizza that results in a 10% donation to the high school football team.

The charge authorization form 220 can include various tools and controls. A payment method control 222, e.g., that is based on the user's settings, can display the user's current payment method (e.g., Amex credit card account number ending in 1234) and allow for a change to the payment method if the control is selected. Payment amount controls 224 can display the current payment amount, and can include a tool for calculating a tip to be included in the charge amount. A keypad 226 can be used, for example, for entering values such as a tip amount. Other controls, tools and displays associated with a pre-tax amount, total payment amount, tip amounts, tax amounts and/or for other purposes can be included. In some implementations, the user provides the payment amount and, for example, the tip amount or percentage. In some implementations, the merchant's provide the amount of tax and the system can use the combination to compute the total amount to authorize.

Once the user is satisfied with the total payment amount, including tax and tip, the user can select an OK control 228 to initiate submission of the payment. Doing so can result in displaying a final authorization form (See FIG. 2D). In some implementations, the consumer provides a total amount due, wherein the system can reverse calculate transaction subtotals (amount, tax, tip etc.). In some implementations, the merchant provides a taxable amount to aid in the reverse calculations. In some implementations, a standard gratuity is automatically calculated and presented for the user. The standard amount can be a user preference, or associated with certain types of transactions (such as transactions associated with fundraisers). In some implementations where gratuity is not appropriate (e.g., in association with a consumer purchase rather than a service item), the gratuity control can be removed/obfuscated or otherwise disabled.

FIG. 2D is a diagram of an example final authorization form 230. The donor application can display the final authorization form 230, for example, upon user selection of the OK control 228. The final authorization form 230 can accept the user's password, e.g., to authorize the transaction.

In some implementations, the password is a personal identification number (PIN) associated with an account for the user and used within the donor application and the payment system 110. For example, the user can enter the user's PIN in a PIN control 232, such as by using the keypad 226. Other types and mechanisms of user authorization are possible. Once the user has finished entering a PIN in the PIN control 232, for example, the user can then select a submit control 234 to proceed to the next step in the transaction.

Figures 2E, 2F:
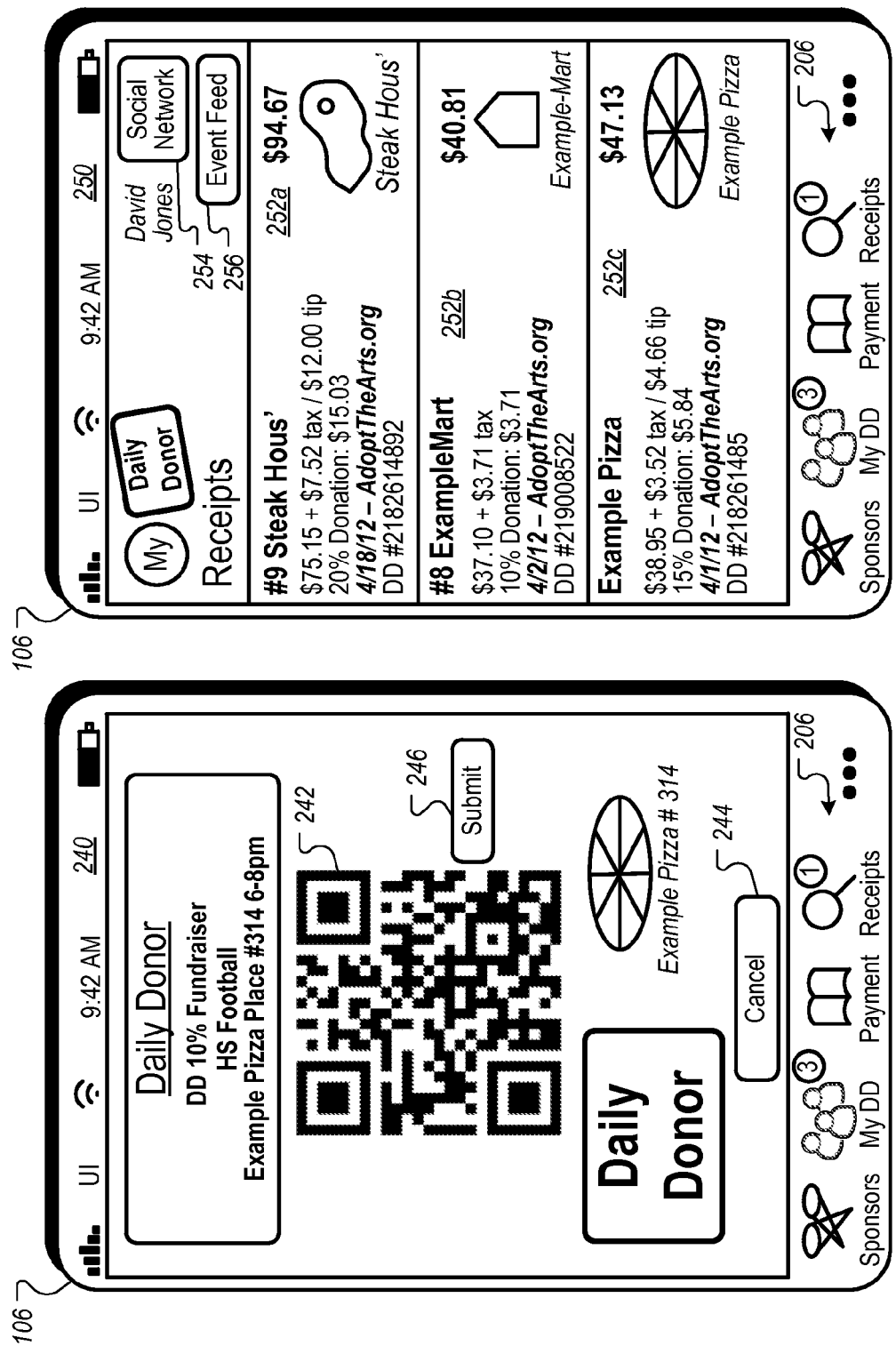
FIG. 2E is a diagram of an example code presentation screen.
FIG. 2F is a diagram of an example receipt page.

FIG. 2E is a diagram of an example code presentation screen 240. For example, the code presentation screen 240 can display a code 242, such as an image recognition (IR) entity, a quick response (QR) code, some other code/image, or some other object. The purpose of the code 242, for example, can be for the merchant associated with the promotion to scan the code to complete the transaction, e.g., to provide a level of merchant authorization for the transaction. The scanning can occur, for example, when the user makes the pizza purchase at the Example Pizza establishment.

In some implementations, a cancel control 244 is provided for enabling cancellation of the transaction through the payment system, e.g., after the code is presented. For example, by selecting the cancel control 244, the user can cancel the entire transaction, including crediting or reversing amounts charged on the user's account (e.g., Amex card 1234) using the charge authorization form 220.

If the transaction continues and is not canceled, then the user can select a submit control 246 to submit the transaction, including the associated payment. The payment system 110 processes the payment and produces the code for presentation to the merchant. In some implementations, a pre-authorization for the credit card is processed prior to presentation of the code to the merchant. The full transaction can be processed when the correct code has been received and matched to a merchant's identifier within the system. In addition, the payment system can identify any donation that is to be made (including identifying an amount and entity associated with the donation). The payment system 110 can then credit the donation upon completion of the transaction.

In some implementations, the payment system 110 can include, or communicate with, an organization interface that is used by organizations (e.g., charities, schools, etc.) to set up promotions involving events and offers. For example, the payment system 110 can receive a query from an organization that is seeking charitable contributions. The query can include, for example, the identification of a first merchant to sponsor a charity event. Using this information, the payment system 110 can approach the first merchant (e.g., by email or some other communication method), including providing the first merchant with details associated with the charitable event and information related to the organization and a size of the charitable event. The payment system 110 can then finalize timing and details associated with event with the merchant, and provide feedback to the organization notifying them of the acceptance (or denial) of the event. If the event is accepted, for example, the payment system 110 can process transactions from members of the payment system 110 during the event, including presenting information about the first merchant and the event. The information can be presented in response to receiving the indication to initiate a payment transaction using the payment system 110 when a user is in proximity to a physical location associated with the first merchant.

FIG. 2F is a diagram of an example receipt page 250. For example, receipt entries 252a-252c can provide the user's payment information for promotions (e.g., promotions 212a-212c) for which transactions resulted. The receipt information can identify the name of the merchant associated with each of the promotions, and details of each transaction, e.g., including a bill amount, a tax amount, a tip amount, and a donation amount. The receipt information can identify a date that the transaction occurred, the name of the receiving entity, and an identifier that identifies the transaction in the payment system 110.

In some implementations, a social network control 254 that the user can select can be provided, e.g., so as to enable a user to post information about the promotion and/or associated information to a social network.

Figure 2H:
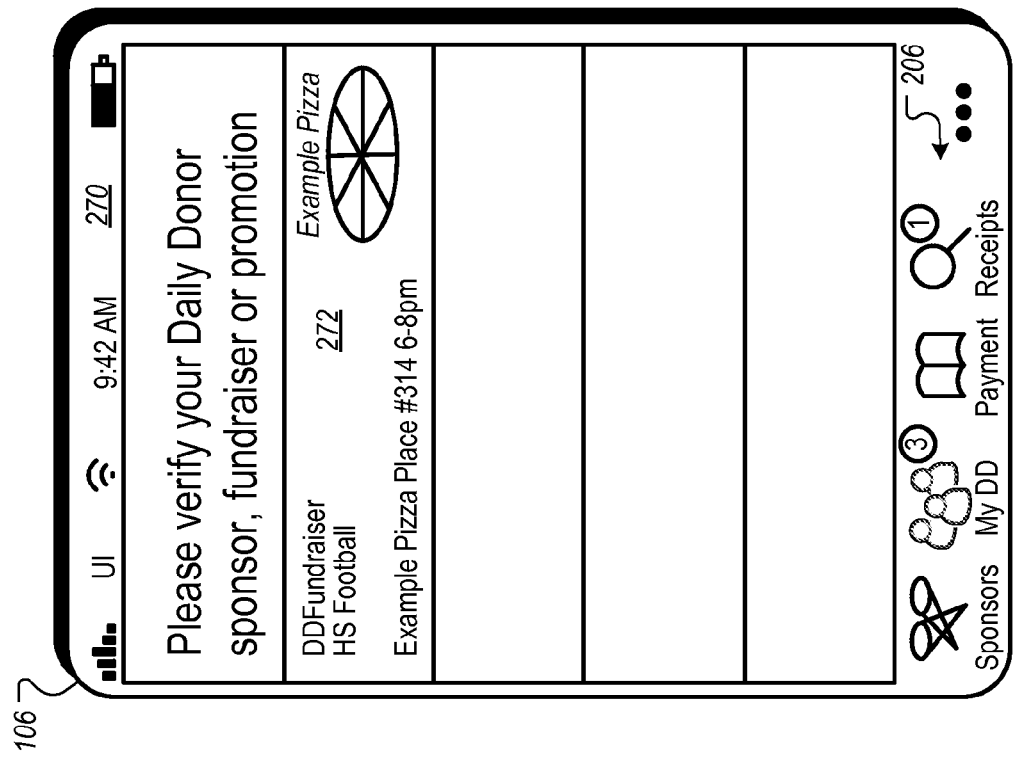
FIG. 2H is a diagram of an example sponsor/fundraiser interface.
Figure 2G:
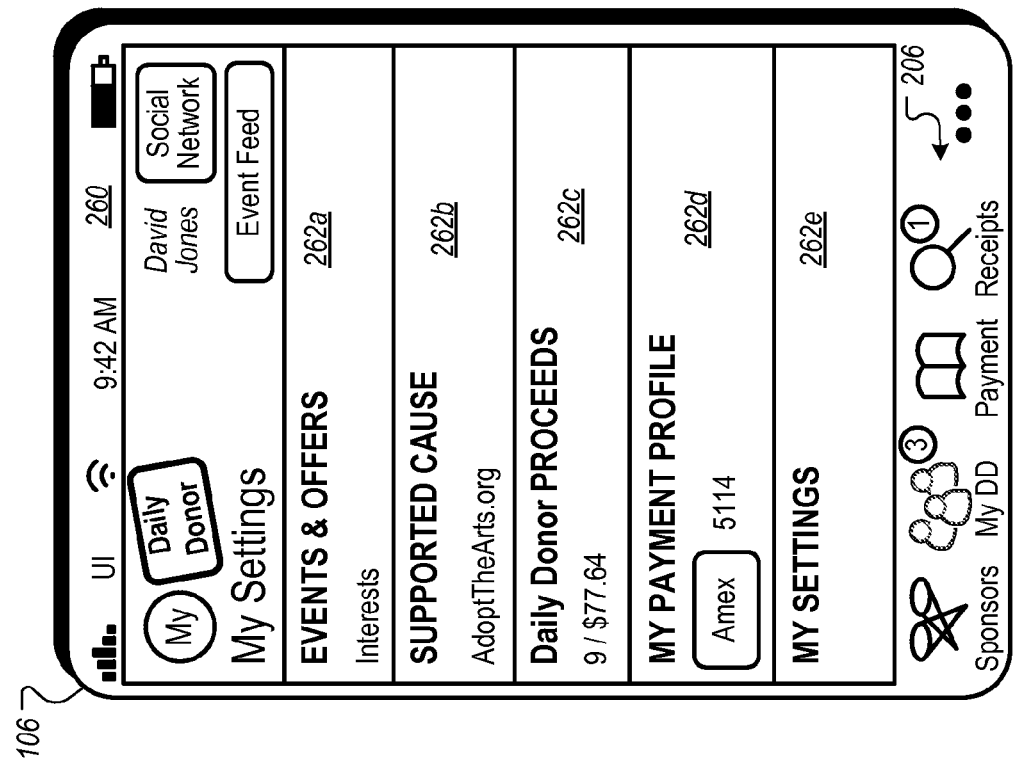
FIG. 2G is a diagram of an example user settings interface.

FIG. 2G is a diagram of an example user settings screen 260 for maintaining user settings 262a-262e. For example, the user settings screen 260 can be accessed by selecting the settings control 219 from the promotion selection screen 210 or from other screens. The user can use the events and offers settings 262a, for example, to specify the types of events and offers for which the user has an interest, such as promotions that benefit fine arts and/or other causes. A supported cause setting 262b identifies and allows changes to the user's current cause of choice, e.g., a particular fine arts charity or not-for-profit organization. A daily donor proceeds setting 262c can provide a total number of promotions for which the user has completed a transaction and total monetary amount of the charitable amount raised by the user. A payment settings area 262d, for example, can include displays and controls that identify the user's current payment method within the payment system 110 and can allow the user to specify a different payment method. Other types of settings, displays and controls are possible. A my settings area 262e can be used to adjust account settings. Other controls are possible.

FIG. 2H is a diagram of an example sponsor/fundraiser screen 270. For example, the sponsor/fundraiser screen 270 can be displayed to the user by the donor application when the payment system 110 has identified a promotion (e.g., promotion 272) that may be of interest to the user. Identification may occur, for example, when the user's mobile device has been determined to have entered an area that is within a pre-defined threshold distance of a particular merchant. Determining that the user may be interested in a promotion can depend on the proximity of the user's current location and the location of merchants that would honor the promotion. For example, promotions within a 500 hundred foot radius of the user may be presented to the user for verification. The radius may vary depending on the concentration of sponsors (merchants) in a given area and other factors.

Figure 3:
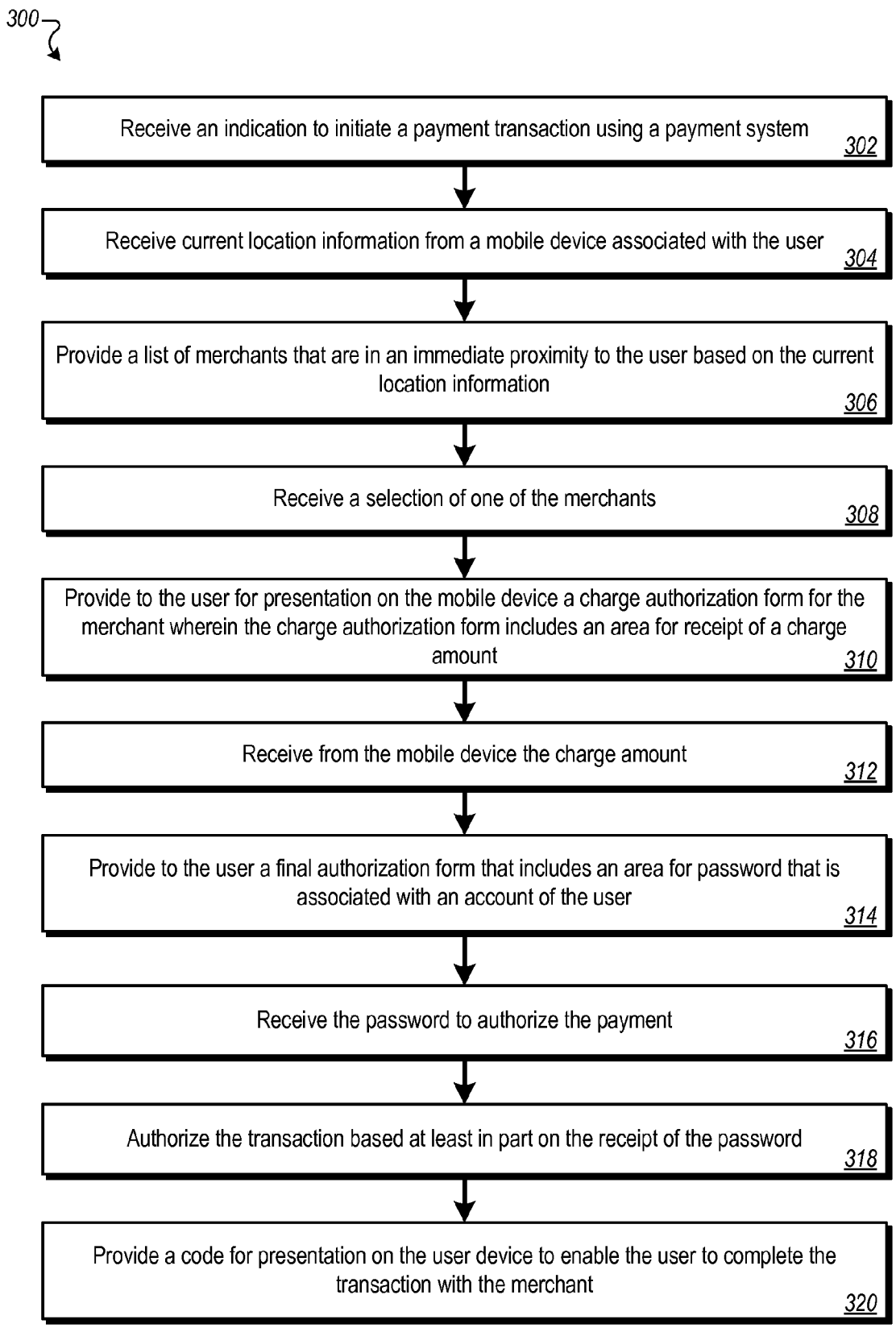
FIG. 3 is a flow diagram of an example process for completing a transaction.

FIG. 3 is a flow diagram of an example process 300 for completing a transaction using a donor system. In some implementations, the payment system 110 can perform steps of the process 300 using instructions that are executed by one or more processors. FIGS. 1-2H are used to provide example structures and interaction points associated with the steps of the process 300.

An indication is received to initiate a payment transaction using a payment system (302). The indication can be received, for example, when an application is initiated on the mobile device associated with payment transactions. For example, by starting the donor application on the device, the user can indicate a desire to initiate a payment transaction within the payment system 110 for a proximate merchant. The donor application can display the user interface 200 at this time, including displaying the initiation message 202.

Current location information is received from a mobile device associated with the user (304). For example, during the initiation of the donor application, the payment system 110 can receive the current location of the user device 106, such as using global positioning system (GPS) capabilities of the user's mobile device and/or other ways for determining the geographic location of the device. In some implementations, while the location is being determined, the donor application can display the initiation message 202 indicating that the location is being determined.

A list of merchants that are in an immediate proximity to the user is provided based on the current location information (306). For example, referring to FIG. 2B, the donor application can display the promotions 212a-212c, each one being in close proximity to the user device 106. The merchant labels 214a-214c, for example, can collectively list the merchants. The payment system 110 can determine that the merchants are nearby the user, for example, by performing a distance comparison between the mobile device's GPS coordinates and known geographical coordinates of the merchants. The GPS coordinates for the merchant are bound to the merchant, much the same as an identifier or user id being bound to a particular user. Of course, the merchant can update the coordinates, such as when the merchant's brick and mortar location changes or a new location is added.

A selection of one of the merchants is received (308). For example, the user can select one of the merchant labels 214a-214c or some other control associated with a particular one of the promotions 212a-212c. The selection can be received, for example, by the payment system 110.

In some implementations, providing the list of merchants can further include providing a list of promotions for each merchant that are supported by the payment system and receiving a selection of one of the merchants can include receiving a selection of one of the promotions. For example, the promotions 212a-212c that are displayed by the donor application can include promotion descriptions 216a-216c, respectively, each describing the corresponding promotion associated with the merchants identified by merchant labels 214a-214c, respectively. As an example, for the promotion 212c, the merchant label 214c is "Example burrito dealer" and the corresponding promotion description 216c is "November . . . Burrito promotion and earn $2 for your school."

A charge authorization form for the merchant is provided to the user for presentation on the mobile device, the charge authorization form including an area for receipt of a charge amount (310). For example, upon user selection of one of the promotions 212 (e.g., promotion 212b) on the promotion selection screen 210, the donor application can display the charge authorization form 220.

In some implementations, the process 300 can further include receiving authentication information from the user to initiate a transaction. For example, receipt of an indication by the user to initiate a payment transaction can require the system (e.g., payment system) first perform a user authorization to verify, for example, that the user is an authorized user of the payment system 110. For example, the user can be required to enter valid user authentication credentials prior to providing the charge authorization form 220.

The charge amount is received from the mobile device (312). For example, the user can enter the charge amount for the transaction using controls on the charge authorization form 220.

A final authorization form is provided to the user (314). In some implementations, the form can include an area for a password that is associated with an account of the user. For example, upon selection of the OK control 228, the donor application can display a confirmation screen in which the user can authorize and finalize the payment.

The authorization form is received (316). For example, the user can enter a PIN in the PIN control 232, and the donor application can provide the user's PIN to the payment system 110 for verification.

The transaction is authorized based at least in part on the receipt of the authorization form (318). As an example, the payment system 110 can either authorize the transaction (e.g., if the entered PIN is valid) or generate an error if the PIN is invalid. In some implementations, upon entry of an invalid PIN or other invalid user credentials, an error screen can be displayed to the user for re-entry of the PIN. In some implementations, the user account can be locked upon the occurrence of a pre-determined number (e.g., three) of consecutive incorrect PIN entry attempts.

A code is provided for presentation on the user device to enable the user to complete the transaction with the merchant (320). For example, the code 242, such as a QR code, can be displayed on the code presentation screen 240. The user may subsequently display or present the code to the merchant who sponsors the transaction, or the user can select the control 244 to cancel the transaction through the payment system 110. In some implementations, the transaction is facilitated through a merchant integrated point of sale system scanner or the like to be able to read the code. That is, in some implementations, a merchant device can be used to read the code and complete the transaction, including linking information (through the point of sale system or otherwise) back to the payment system 110.

In some implementations, the process 300 can further include determining a donation to be associated with the transaction, then crediting the entity upon completion of the transaction. For example, when the transaction occurs, including the merchant scanning the code 242, the payment system 110 can determine that AdoptTheArts.org is the associated charitable organization that is sponsored by Example Pizza. The payment system 110 can then credit the charitable organization upon completion of the transaction.

In some implementations, the process 300 can further include providing one or more of a summary of a single transaction, all transactions in a time period, or a most recent transaction to a user. For example, the receipt page 250 or a similar interface can provide the user with a summary of completed transactions. The receipt page 250, for example, can include controls that enable the user to select one particular transaction, the most recent one, a set of transactions, or other grouping of transactions according to user-entered criteria.

In some implementations, the process 300 can further include steps that support an organization interface, e.g., that one of the organizations 108 can use to set up promotions. For example, a query can be received from an organization that is seeking charitable contributions. The query can include the identification of a first merchant (e.g., a car dealership) to sponsor a charity event (e.g., a test drive fundraiser). The first merchant can be approached (e.g., through a communication from the payment system 110), including providing the first merchant with details associated with the charitable event and information related to the organization and a size of the charitable event. Timing and details associated with event can be finalized with the merchant, e.g., though email communications or some other exchange of information over the networks 102. Feedback is provided to the organization notifying them of the acceptance of the event, such as an email from the payment system 110 to the particular organization 108 who requested an event. Transactions are processed from members of the payment system 110 during the event. The processing includes presenting information about the first merchant and the event in response to receiving the indication to initiate a transaction using the payment system when a user is in proximity to a physical location associated with the first merchant. For example, a user with the donor application on the user device 106 can receive a notification of a promotion for a nearby merchant that sponsors one of the user's charities.

Figure 4:
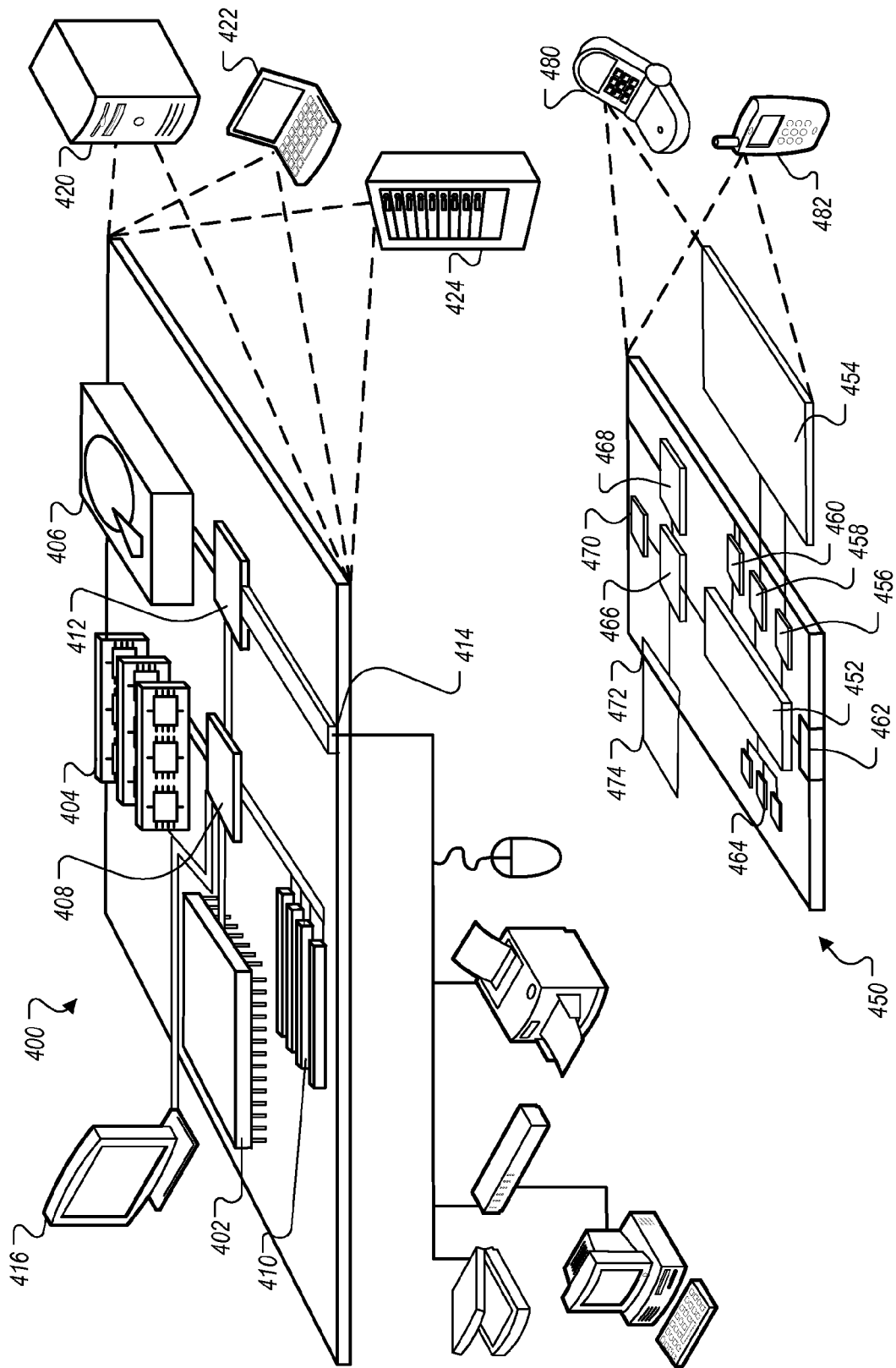
FIG. 4 is a block diagram of computing devices that may be used to implement the systems and methods described in this document.

FIG. 4 is a block diagram of computing devices 400, 450 that may be used to implement the systems and methods described in this document, as either a client or as a server or plurality of servers. Computing device 400 is intended to represent various forms of digital computers, such as laptops, desktops, workstations, personal digital assistants, servers, blade servers, mainframes, and other appropriate computers. Computing device 400 is further intended to represent any other typically non-mobile devices, such as televisions or other electronic devices with one or more processors embedded therein or attached thereto. Computing device 450 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a computer-readable medium. In one implementation, the memory 404 is a volatile memory unit or units. In another implementation, the memory 404 is a non-volatile memory unit or units.

The storage device 406 is capable of providing mass storage for the computing device 400. In one implementation, the storage device 406 is a computer-readable medium. In various different implementations, the storage device 406 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 404, the storage device 406, or memory on processor 402.

The high speed controller 408 manages bandwidth-intensive operations for the computing device 400, while the low speed controller 412 manages lower bandwidth-intensive operations. Such allocation of duties is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can process instructions for execution within the computing device 450, including instructions stored in the memory 464. The processor may also include separate analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD display or an OLED display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provided in communication with processor 452, so as to enable near area communication of device 450 with other devices. External interface 462 may provide, for example, for wired communication (e.g., via a docking procedure) or for wireless communication (e.g., via Bluetooth or other such technologies).

The memory 464 stores information within the computing device 450. In one implementation, the memory 464 is a computer-readable medium. In one implementation, the memory 464 is a volatile memory unit or units. In another implementation, the memory 464 is a non-volatile memory unit or units. Expansion memory 474 may also be provided and connected to device 450 through expansion interface 472, which may include, for example, a subscriber identification module (SIM) card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIM cards, along with additional information, such as placing identifying information on the SIM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS receiver module 470 may provide additional wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
   receiving a query from an organization that is seeking charitable contributions the query including an identification of a first merchant to sponsor a charity event;
   approaching the first merchant including providing the first merchant with details associated with the charity event including information related to the organization and a size of the charity event;
   after acceptance by the first merchant, providing feedback to the organization notifying them of the acceptance of the charity event; and
   processing, by one or more processors, transactions from members of a payment system during the charity event including presenting information about the first merchant and the charity event in response to receiving an indication to initiate a payment transaction using the payment system when a user is in proximity to a physical location associated with the first merchant, wherein processing transactions includes
      receiving from a user an indication to initiate a payment transaction using a payment system;
      receiving current location information from a mobile device associated with the user;
      providing a list of merchants that are in an immediate proximity to the user based on the current location information;
      receiving a selection of one of the merchants;
      providing to the user for presentation on the mobile device a charge authorization form for the merchant wherein the charge authorization form includes an area for receipt of a charge amount;
      receiving from the mobile device an indication of the charge amount;
      providing to the user a final authorization form that includes an area for a password that is associated with an account of the user;
      receiving the password to authorize the payment;
      authorizing the transaction based at least in part on the receipt of the password; and
      providing a code for presentation on the user device to enable the user to complete the transaction with the merchant.

2. The method of claim 1 further comprising receiving authentication information from the user to initiate a transaction.

3. The method of claim 2 further comprising authenticating the user prior to providing the charge authorization form.

4. The method of claim 1 wherein receiving the indication to initiate a payment transaction includes initiating an application on the mobile device associated with payment transactions.

5. The method of claim 1 wherein providing a list of merchants further includes providing a list of promotions for each merchant that are supported by the payment system and wherein receiving a selection of one of the merchants includes receiving a selection of one of the promotions.

6. The method of claim 1 wherein the charge amount is entered by the user.

7. The method of claim 1 wherein the charge authorization form includes a tool for calculating a tip to be included in the charge amount.

8. The method of claim 1 wherein the password is a personal identification number associated with an account for the user.

9. The method of claim 1 wherein the code is a quick response (QR) code.

10. The method of claim 1 further comprising coincident with providing the code, providing a control for enabling a cancellation of the transaction through the payment system.

11. The method of claim 1 further comprising providing one or more of a summary of a single transaction, all transactions in a time period or a most recent transaction.

12. The method of claim 1 further comprising determining an entity that is associated with the transaction in the payment system and crediting the entity upon completion of the transaction, wherein the entity is the organization and is different from the first merchant.

13. The method of claim 1 further comprising:
   finalizing timing and details associated with the charity event with the first merchant prior to sending the notification to the organization.

14. A system comprising:
   a mobile device configured to receive from a user an indication to initiate a payment transaction using a payment system; and
   a payment system configured to receive current location information from the mobile device associated with the user, and provide a list of merchants that are in an immediate proximity to the user based on the current location information;
   wherein the payment system
      receives a query from an organization that is seeking charitable contributions, the query including an identification of a first merchant to sponsor a charity event,
      approaches the first merchant including providing the first merchant with details associated with the charitable event including information related to the organization and a size of the charity event,
      after acceptance by the first merchant, provides feedback to the organization notifying them of the acceptance of the event, and
      processes transactions from members of the payment system during the event including presenting information about the first merchant and the event in response to receiving an indication to initiate a payment transaction using the payment system when a user is in proximity to a physical location associated with the first merchant;
   wherein the mobile device is configured to receive the list and provide a selection to the payment system;
   wherein the payment system is configured to receive a selection of one of the merchants and providing to the user for presentation on the mobile device a charge authorization form for the merchant wherein the charge authorization form includes an area for receipt of a charge amount;
   wherein the mobile device is configured to present the charge authorization form to the user and receive a charge amount;
   wherein the payment system is configured to receive the charge amount and other data and provide to the user a final authorization form that includes an area for a password that is associated with an account of the user, the payment system being configured to receive the password to authorize the payment; authorizing the transaction based at least in part on the receipt of the password; and providing a code for presentation on the user device to enable the user to complete the transaction with the merchant.

* * * * *